United States Patent [19]

Nakada et al.

[11] 4,364,299
[45] Dec. 21, 1982

[54] ELECTRONIC MUSICAL INSTRUMENT HAVING SYSTEM FOR JUDGING PLAYER'S PERFORMANCE

[75] Inventors: Akira Nakada; Eisaku Okamoto; Kiyoshi Yoshida, all of Hamamatsu, Japan

[73] Assignee: Nippon Gakki Seizo Kabushiki Kaisha, Shizuoka, Japan

[21] Appl. No.: 217,896

[22] Filed: Dec. 18, 1980

[30] Foreign Application Priority Data

Dec. 27, 1979 [JP] Japan ................... 54/171404

[51] Int. Cl.³ ............... G09B 15/02; G09B 15/04
[52] U.S. Cl. ............... 84/478; 84/477 R
[58] Field of Search ............ 84/478, 477 R; 434/362

[56] References Cited

U.S. PATENT DOCUMENTS

| 4,012,979 | 3/1977 | Wemekamp | 84/478 X |
| 4,052,799 | 10/1977 | Journot | 434/362 |
| 4,281,579 | 8/1981 | Bennett, Sr. | 84/478 |

Primary Examiner—Stanley J. Witkowski
Attorney, Agent, or Firm—Frishauf, Holtz, Goodman & Woodward

[57] ABSTRACT

An electronic musical instrument comprises a keyboard arranged to produce key code signals in response to key operations thereof and a memory storing performance data constituting progression of a music and corresponding to key operations to be effected on the keyboard to play the music. A key operation judging circuit is provided which compares the key code signals produced by the keyboard with the performance data read out of the memory to detect whether or not a pupil or trainee correctly operates keys in a corresponding relation to the performance data read out of the memory. The percentages of correct key operations are calculated and displayed with respect to the key-on timing and the pitch and duration of notes.

11 Claims, 5 Drawing Figures

ELECTRONIC MUSICAL INSTRUMENT HAVING SYSTEM FOR JUDGING PLAYER'S PERFORMANCE

BACKGROUND OF THE INVENTION

The present invention relates to an electronic musical instrument and, more particularly, to an electronic musical instrument which is so constructed that a pupil or trainee is capable of objectively confirming the level of his or her skill in performance.

For training a pupil or trainee to play a keyboard musical instrument, it is general practice that the pupil plays the instrument while looking at a sheet of music, and a teacher instructs the pupil while listening to the performance of the pupil. Such a training method is suitable for one-to-one training of a pupil by a teacher, but is not suitable for a group training system in which one teacher teaches a number of pupils.

In either the one-to-one training system or the group training system, it is difficult to objectively evaluate the technical level of pupils in performance. Therefore, the training must be performed based on a teacher's subjective judgements about the performance of students.

SUMMARY OF THE INVENTION

It is, therefore, the primary object of the present invention to provide an electronic musical instrument in which a pupil or trainee is capable of objectively evaluating the level of his skill in keyboard performance.

It is another object of the present invention to provide an electronic musical instrument in which the error rate of a pupil's key operations on a keyboard for musical performance may be objectively evaluated.

It is still another object of the present invention to provide an electronic musical instrument in which the error rate of a plurality of factors related to a pupil's key operations may be objectively evaluated by comparing the pupil's key operations with exemplary performance data read out of a memory.

In order to effect the foregoing objects, an electronic musical instrument of this invention comprises memory means for storing exemplary performance data representative of progression of notes of a musical piece and corresponding to key operations to be effected on a keyboard to play the musical piece, and keyboard means responsive to key operations to produce performance signals (key code signals). A pupil or trainee operates the keyboard means to play the music stored in the memory means. Key operation judging circuit means is provided which compares the performance signals produced by the keyboard means with the performance data read out of the memory means to detect whether or not the pupil or trainee correctly operates keys in a corresponding relation to the performance data read out of the memory means. Tolerance means is provided to establish a tolerance for the comparison by the key operation judging circuit means so that a key operation is considered correct when a key is operated within the established tolerance relative to the timing of the corresponding performance data read out of the memory means.

The key operation judging circuit means preferably comprises counting means for counting correct key operations effected on the keyboard with respect to the key-on timing, and the pitch and duration of notes.

Marking circuit means is provided to calculate the percentages of correct key operations with respect to the key-on timing, and the pitch and duration of note. The percentages of correct key operations are displayed by display means to visually indicate the level of a pupil's skill in performance.

DESCRIPTION OF THE PREFERRED EMBODIMENT

Figure 1:
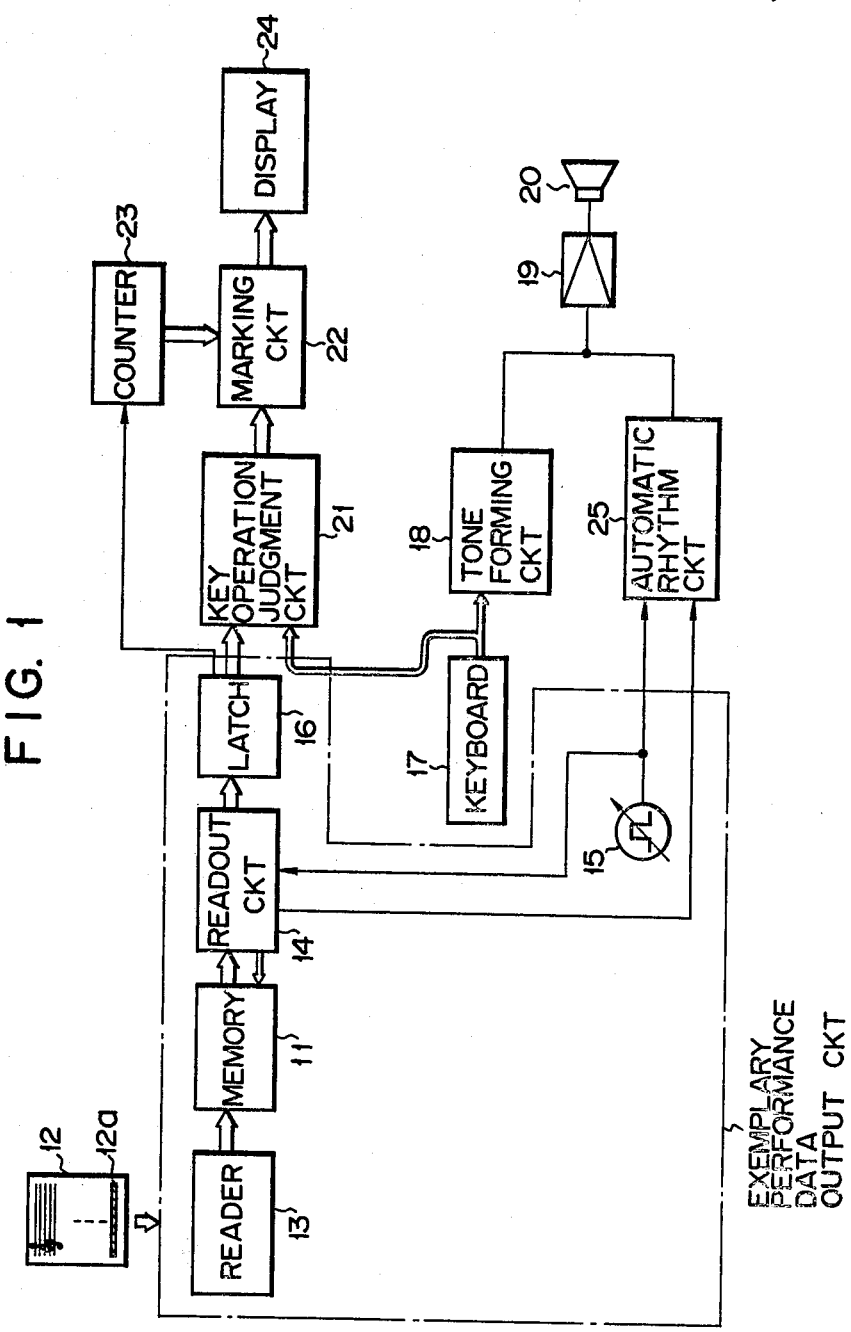
FIG. 1 is a schematic block diagram of an electronic musical instrument according to this invention.

Referring to FIG. 1, there is shown an electronic musical instrument of this invention which comprises a memory 11 such as a random access memory (RAM) for storing exemplary performance data. The performance data to be stored in RAM 11 are recorded in the form of digital words on a magnetic recording section 12a formed on a music sheet 12, for example. The performance data may be read out by a reader 13 attached to a music stand and written into RAM 11 by placing the music sheet 12 on the music stand.

The performance data comprises note data and rest data constituting progression of a music, and the note data is further divided into pitch data and duration data. The pitch data comprises a pitch mark code or UK (upper keyboard) code and a key specifying code, except all 0s, for specifying a key on the upper keyboard. The duration data comprises a duration mark code and a duration specifying code representing the duration of a note. The rest data includes first data and second data corresponding to the pitch data and the duration data of note. The first data includes the UK code and a key specifying code of all 0s indicating zero pitch. The second data includes the duration mark code and a duration specifying code indicating the duration of a rest.

Figures 2, 3:
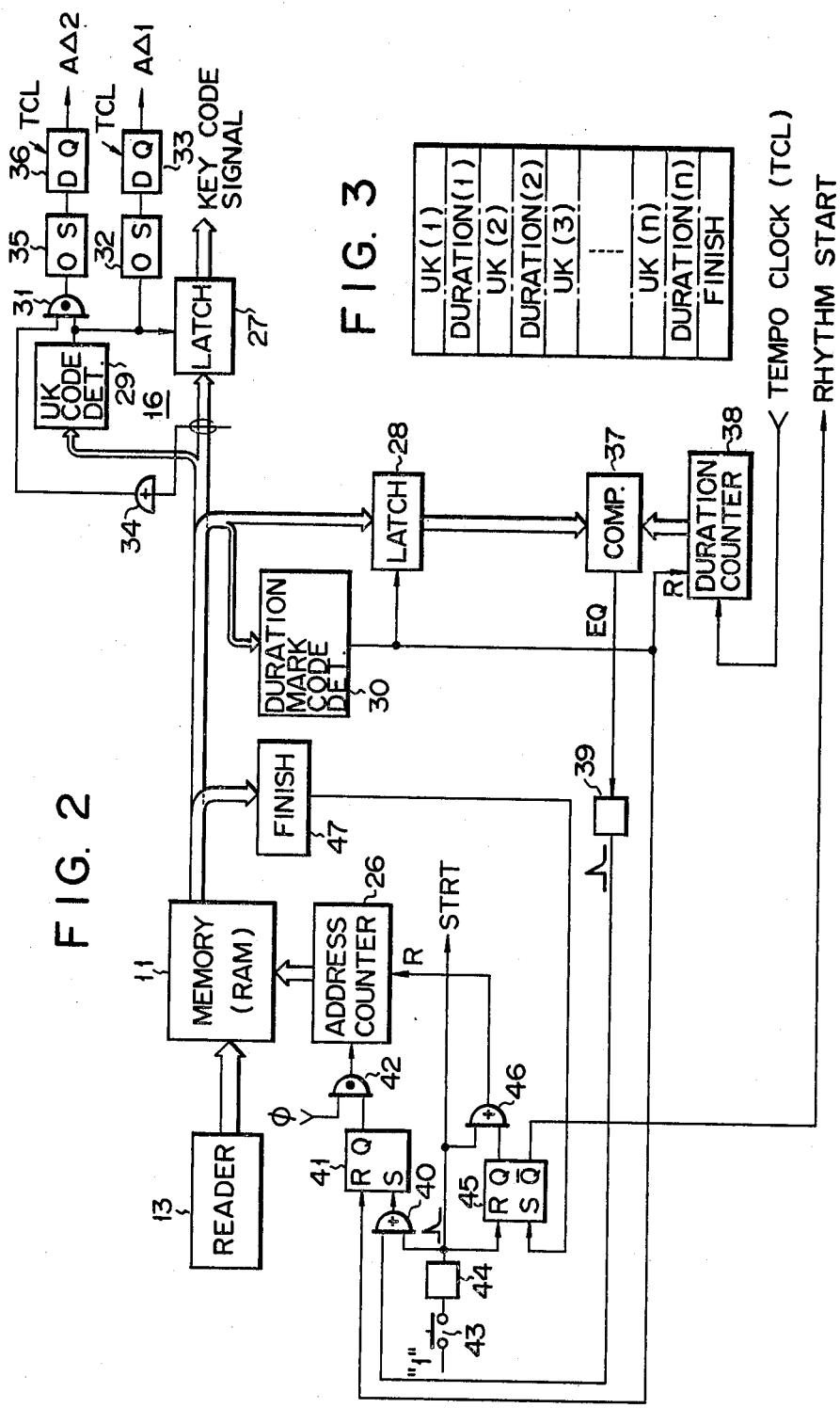
FIG. 2 is a block diagram of the read out circuit shown in FIG. 1.
FIG. 3 shows a memory map representing the arrangement of performance data stored in the memory of FIG. 1.

The respective data of performance information are sequentially stored in the respective addresses of RAM 11 according to the progression of music. As shown in FIG. 3, in the case of notes, duration data DURATION(N) is stored in the address immediately succeeding the address of the corresponding pitch data UK(N). In the case of rests, the first data representing a rest is followed by the second data representing the duration of the rest. The stored performance data are sequentially read out by a readout circuit 14 according to the progression of music. A tempo pulse generated by a tempo oscillator 15 and having a period of 1/12 of the duration of a quarter note is applied to the readout circuit 14 so that the respective performance data are sequentially read out at time intervals of their duration. The data of notes and rests read out by the readout circuit 14 are sequentially latched by a latch circuit 16.

A pupil operates a keyboard 17 to play the music stored in RAM 11 while watching the music sheet 12. The keyboard 17 is so arranged as to produce a key specifying code signal in response to operation of the keyboard 17. For the same pitch (key) a key code generated by the keyboard 17 and a key code stored in the RAM 11 are naturally identical with each other. The keyboard 17 produces a key code of all 0s when none of keys is operated.

The key code signals from the keyboard 17 are supplied to a tone forming circuit 18 to produce musical tone signals which are supplied to an amplifier 19 followed by a loudspeaker 20 so as to reproduce musical sounds.

The performance signals or key code signals from the keyboard 17 together with the exemplary performance data latched by the latch circuit 16 are supplied to a key operation judgement circuit 21 which judges whether or not a key corresponding to exemplary performance data has been correctly operated on the keyboard 17 and counts the number of correct operations of keys corresponding to the exemplary performance data. The number of correct key operations is supplied to a marking circuit 22.

The count output of a counter 23 is supplied to the marking circuit 22. The counter 23 counts the number of notes or the number of notes and rests read out of RAM 11. The marking circuit 22, based on the number of correct key operations from the key operation judgement circuit 21 and the count number of the counter 23, calculates the percentage of the number of correct key operations which is visually indicated by a display 24.

The tempo clock pulse TCL of the tempo oscillator 15 is supplied to an automatic rhythm generation circuit 25 to produce a desired rhythm tone signal which is supplied to the amplifier 19. The automatic rhythm generation circuit 25 is enabled by a RHYTHM START signal from the readout circuit 14 to produce a rhythm tone signal.

FIG. 2 shows in more detail the exemplary performance data output circuit surrounded by the dashed lines in FIG. 1. The addresses of RAM 11 are designated by an address counter 26 for counting a clock pulse signal $\phi$ (e.g., 1 MHz), so that the exemplary performance data are sequentially read out of the memory 11. The data read out from the RAM 11 is applied to a latch circuit 27 which is enabled by an output signal of UK code detecting circuit 29 for detecting the UK code, and to a latch circuit 28 which is enabled by an output signal from a duration mark code detecting circuit 30 for detecting the duration mark code. That is, a key specifying code signal read out of RAM 11 is latched in the latch circuit 27, while duration data is latched in the latch circuit 28. An output signal of the UK code detecting circuit 29 is applied to an AND circuit 31 and a one-shot multivibrator circuit 32. An output signal of the one-shot circuit 32 is applied to a delayed flip-flop circuit 33 which is driven by the tempo clock TCL to produce a first timing signal $A\Delta 1$, which has a pulse width corresponding to one period of the tempo clock TCL, every time the performance data for note or rest is read out of RAM 11. Thus, the first timing signal $A\Delta 1$ is produced in a corresponding relation to a timing at which a key is to be depressed or released on the keyboard, that is, a key operation change timing. To the AND circuit 31 is applied an output signal of an OR circuit 34 responsive to the key specifying code signal. The OR circuit 34 produces an output signal of logical level 1 for the key code signals, except for the code for the rest (all the bits are zero), to enable the AND circuit 31. An output signal of the AND circuit 31 drives a one-shot multivibrator 35 to produce an output pulse which is applied to a delayed flip-flop circuit 36 driven by the tempo clock TCL for providing a delay time corresponding to one period of the tempo clock to produce a second timing signal $A\Delta 2$ having the same pulse width as one period of the tempo clock TCL. This second timing signal $A\Delta 2$ is produced every time note data is read out of RAM 11. This is, the second timing signal is produced in a corresponding relation to a timing at which a key is to be depressed on the keyboard, i.e., a key-on timing.

The duration specifying code latched by the latch circuit 28 is compared in a comparator 37 with the count number of a duration counter 38 for counting the tempo clock TCL. The counter 38 is cleared every time the duration mark code is detected by the detector 30. The output signal of the detector 30 is also applied to the reset input of a flip-flop circuit 41. The circuit 41 is reset every time the duration mark code is detected by the detector 30 to disable an AND gate 42 from applying the clock pulse $\phi$ to the address counter 26. As a result, the readout of data from RAM 11 is interrupted.

The comparator 37 produces an EQUAL signal when the count number of the counter 38 becomes equal to the duration code latched in the latch circuit 28, in other words, when a length of time represented by the duration code has lapsed from the time the duration code is latched in the latch circuit 28. The EQUAL signal is differentiated by a differentiating circuit 39. An output signal of the differentiating circuit 39 is applied to the set input of the flip-flop circuit 41 through an OR circuit 40. When the flip-flop circuit 41 is set, the AND circuit 42 is enabled to apply the clock pulse $\phi$ to the address counter 26, advancing the counter 26. As a result, the readout of data from the RAM 11 reinitiated.

A start switch 43 is provided for producing a start signal STRT for initial setting. This start switch 43 is of self-restoring type, and issues an output signal of logic level 1 when closed. This output signal is differentiated by a differentiating circuit 44 to form the start signal STRT for initial setting of various circuits. The signal STRT is applied to the address counter 26 through an OR circuit 46 to clear the former and also applied to the set input of the flip-flop circuit 41 through OR circuit 40 to start advancing the address counter 26. The signal STRT is also applied to the reset input R of a flip-flop circuit 45 whose set output Q is coupled to the OR circuit 42. As a result, the flip-flop circuit 45 generates a RHYTHM START signal of logic level 1 at its reset output $\overline{Q}$. The flip-flop circuit 45 is set when a FINISH code is detected by a detector 47 for detecting the FINISH code (FIG. 3) which is lastly read out of RAM 11 to indicate the end of music. The flip-flop circuit 45, when set, generates an output signal of logic level 1 at its set output Q which clears the address counter 26 through the OR circuit 46.

Figure 4:
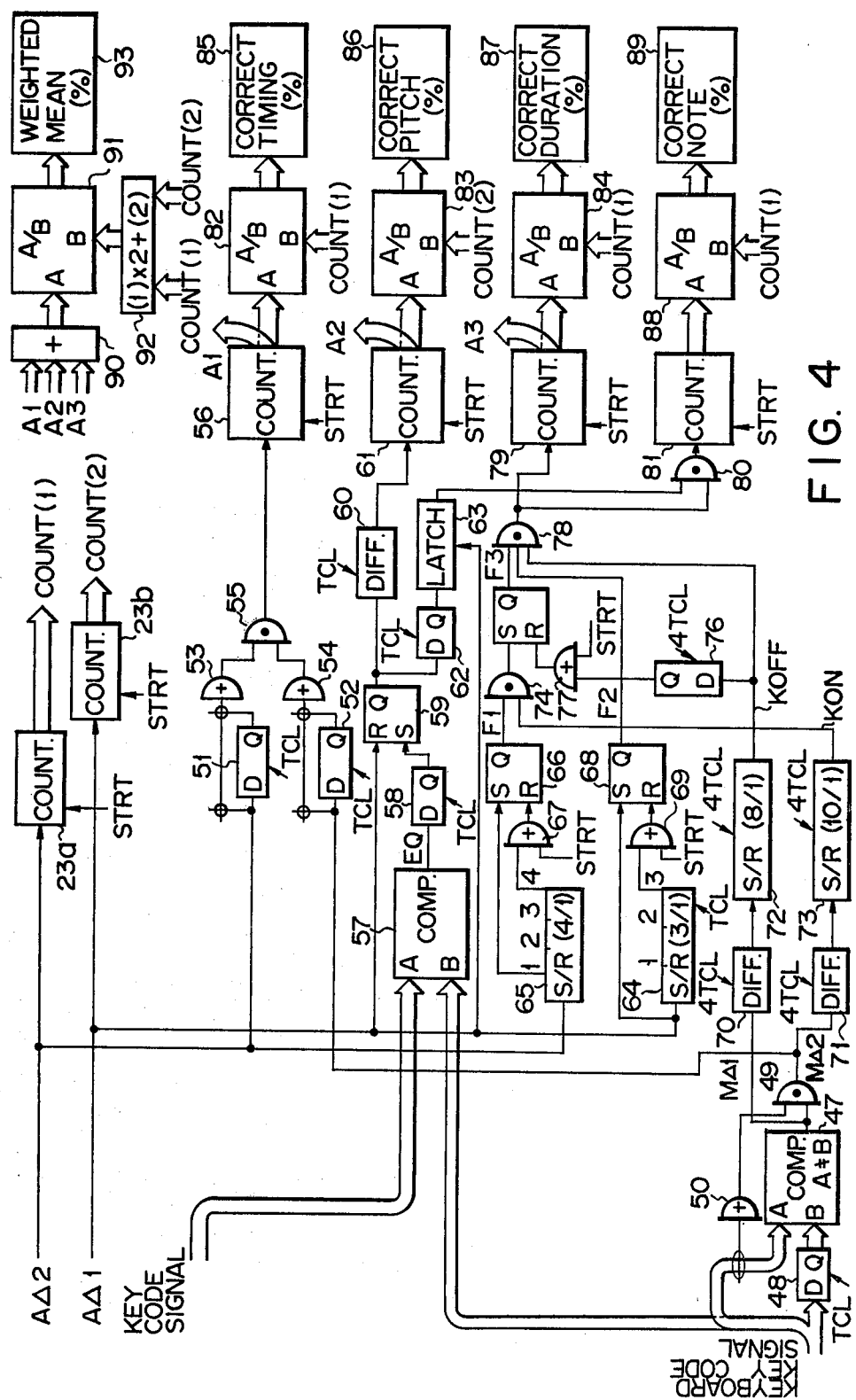
FIG. 4 shows block diagram of the key operation judging circuit and marking circuit of FIG. 1.

To the judgement circuit 21 shown in detail in FIG. 4 are applied the first timing signal $A\Delta 1$ (corresponding to every change in key operation including depression and release of a key on the keyboard) formed in response to the readout of a key code signal corresponding to a note or a rest from RAM 11; the second timing signal $A\Delta 2$ (corresponding to change in the operated keys on the keyboard) generated in response to the readout of a key code signal corresponding to each of notes from RAM 11; and a key code signal for note or rest read out of RAM 11. In this embodiment, the judgement circuit 21, based on the exemplary performance information read out of RAM 11, judges the timing of a key depression by the pupil, the note name (pitch) of a key depressed, and a length of time during which the key is depressed, and calculates the percentages of correct key operations with respect to the timing, the pitch and the duration. The judgement circuit further calculates the percentage of notes played by the pupil which are correct with respect to all of these three factors. Moreover, the weighted mean or gross mean of the correct timing percentage, the correct duration percentage, and the correction pitch percentage is calculated.

The second timing signal $A\Delta 2$ is applied to a counter $23a$ which counts the number of notes contained in the exemplary performance information read out of RAM 11 to provide an output COUNT (1). The first timing signal $A\Delta 1$ is applied to a counter $23b$ which counts the number of notes and rests contained in the exemplary performance information to provide an output COUNT (2). These counters $23a$ and $23b$ are reset by the start signal STRT.

A key code signal generated by the keyboard 17 in response to a key operation by the pupil is directly applied to an input A of a comparator 47 and also to an input B through a delay circuit 48 driven by the tempo clock TCL. When the two key code signals applied to the inputs A and B of comparator 47 are equal to each other, the output of comparator 47 goes low. However, when the two key code signals applied to the inputs A and B are not equal to each other, the output of comparator 47 goes high. Namely, when the key which has been depressed on the keyboard 17 is released, or when another key is depressed, in other words, when the key operation changes, the output of comparator 47 goes high. The output signal of the comparator 47 is utilized as a timing signal $M\Delta 1$ corresponding to each change in key operation or each release of depressed key (keyoff). The timing signal $M\Delta 1$, together with an output signal (always logic level 1 when any key is depressed) of OR circuit 50 receiving the key code signal applied to the input A of comparator 47, is applied to an AND circuit 49 to generate a key depression change timing signal $M\Delta 2$ corresponding to each change in key depression. The timing signals $M\Delta 1$ and $M\Delta 2$ correspond to the timing signals $A\Delta 1$ and $A\Delta 2$, respectively.

Figure 5:
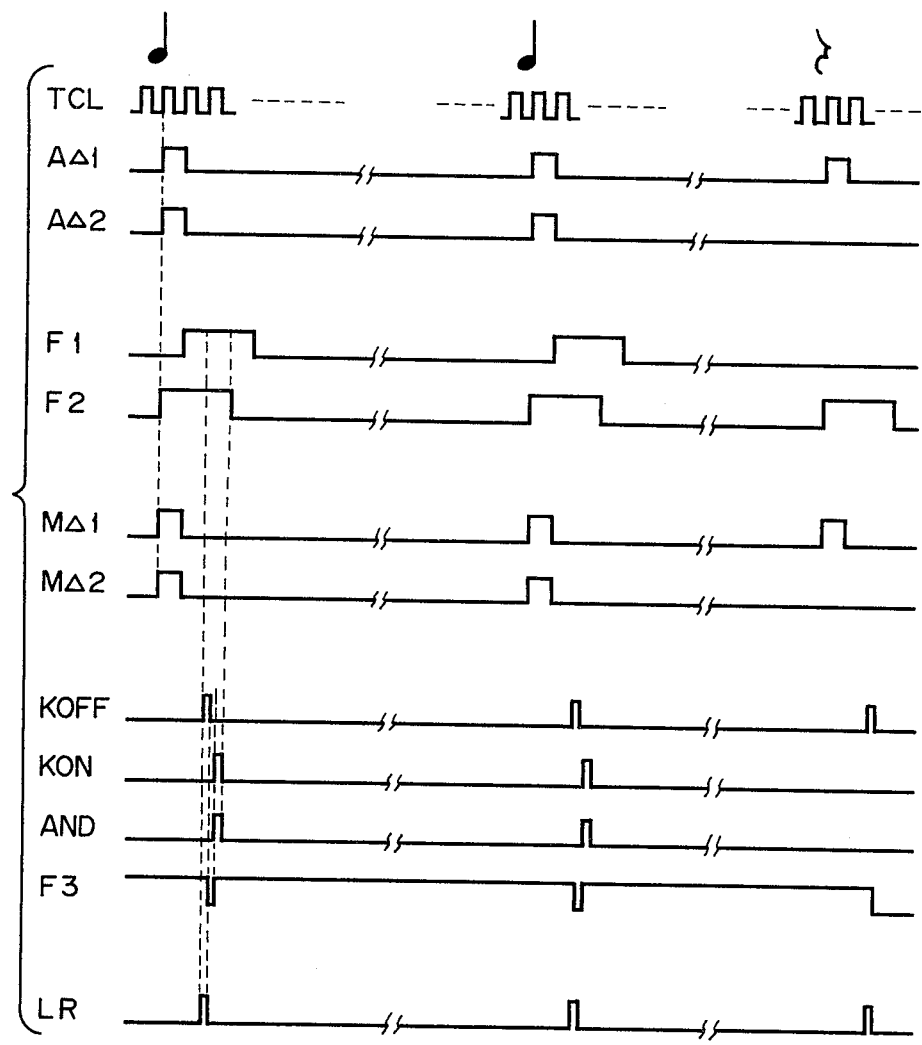
FIG. 5 is a timing diagram useful in explaining the operation of the electronic musical instrument of this invention.

When the data corresponding to a quarter note, a quarter note, and a quarter rest are sequentially read out as shown in FIG. 5, the timing signal $A\Delta 1$ is produced in synchronism with the commencement of readout of respective data. The timing signal $A\Delta 2$ is produced in synchronism with the commencement of readout of note data alone or with the termination of readout of the respective performance data. If it is assumed that key operations have been correctly performed in accordance with the above data, the timing signals $M\Delta 1$ and $M\Delta 2$ are produced in synchronism with the timing signals $A\Delta 1$ and $A\Delta 2$ respectively.

The timing signals $A\Delta 2$ and $M\Delta 2$ are applied to delay circuits 51 and 52 driven by the tempo clock TCL. The input and output signals of delay circuit 51 are applied to an OR circuit 53 to generate an output signal having a pulse width twice that of the timing signal $A\Delta 2$. Similarly, an OR circuit 54 receives the input and output signals of delay circuit 52 and produces an output signal having a pulse width twice that of the timing signal $M\Delta 2$. The output signals of the OR circuits 53 and 54 are applied to an AND circuit 55. When the output signals of the OR circuits 53 and 54 overlap each other time-wise, the AND circuit 55 generates an output signal of logic level 1. In other words, when the readout of note data from RAM 11 and the key depression on the keyboard 17 are performed within an allowable length of time determined by the delay circuits 51 and 52, the AND circuit 55 produces a timing-coincidence signal indicating that the key depression has been performed at correct timing. This timing-coincidence signal is counted by a counter 56 which is cleared by the start signal STRT. Thus, the counter 56 sequentially counts the number of keys which are depressed on the keyboard 17 at correct timing. The count value of counter 56 is applied to a divider 82 to be divided by the number of the notes contained in the exemplary performance information which has been read out, that is, by the count number of counter $23a$ to calculate the percentage of the number of key depressions each performed at a correct timing. The correct timing percentage of key depression is displayed by a display 85.

The key code signal latched by the latch circuit 27 is applied together with the key code signal from the keyboard 17 to a comparator 57. When the key represented by a key code signal read out of RAM is operated correctly on the keyboard 17, the comparator 57 generates a pitch-equal signal which is then applied to the set input of a flip-flop circuit 59 through a delay circuit 58 driven by the tempo clock TCL. The flip-flop circuit 59, before the pitch-equal signal from the delay circuit 58 is applied, is reset by the timing signal $A\Delta 1$. Thus, the flip-flop circuit 59 is set to cause its output Q to go high every time a correct key operation (depression or release) is performed. Th output signal of the flip-flop circuit 59 is differentiated by a differentiation circuit 60 whose output signal is counted by a counter 61. This counter 61 sequentially counts the number of correct key operations corresponding to notes and rests. The count output of counter 61 is applied to a divider 83 to be divided by the count output (COUNT (2)) of the counter $23b$ for counting the number of notes and rests to provide the percentage of the number of operations of correct keys corresponding to the performance data read out of RAM 11.

The set output Q of flip-flop circuit 59 is coupled to a latch circuit 63 which is enabled by the timing signal $A\Delta 1$ through a delay circuit 62 driven by the tempo clock TCL. The pitch-equal signal for the key code signals applied to the inputs A and B of comparator 57 is latched in the latch circuit 63 in synchronism with the readout of a next key code signal from RAM 11.

The timing signals $A\Delta 1$ and $A\Delta 2$ are applied to a three-stage shift register 64 and a four-stage shift register 65 which are driven by the tempo clock TCL. The first and fourth stage outputs of shift register 65 are used for setting and resetting a flip-flop circuit 66. Accordingly, the flip-flop circuit 66 is set with a delay time corresponding to one period of tempo clock TCL from the leading edge of the timing signal $A\Delta 2$ and is reset with a time delay corresponding to three periods of tempo clock TCL. The timing signal $A\Delta 1$ and the output signal of shift register 64 are used for setting and resetting the flip-flop circuit 68. Accordingly, the flip-flop circuit 68 are set and reset as shown by F2 of FIG. 5. The start signal STRT is applied to the reset inputs of the flip-flop circuits 66 and 68 through OR circuits 67 and 69.

The timing signals $M\Delta 1$ and $M\Delta 2$ associated with the key operation on the keyboard 17 are differentiated by differentiating circuits 70 and 71 driven by a clock pulse 4TCL having a frequency four times that of the tempo clock TCL to produce output pulses having a pulse width corresponding to one period of the clock TCL. The output signals of differentiating circuits 70 and 71 are, respectively, applied to an 8-stage shift register 72 and a 10-stage shift register 73 both driven by the clock 4TCL. Accordingly, an ouput signal represented by KOFF in FIG. 5 is taken out of the shift register 72 which is eight clock 4TCL periods behind the leading edge of the timing signal MΔ1. On the other hand, a signal represented by KON in FIG. 5 is taken out of the shift register 73 which is ten clock 4TCL periods behind the leading edge of the timing signal MΔ2. The output signal KON of shift register 73, together with the output signal F1 of flip-flop circuit 66, is supplied to an AND circuit 74 whose output signal AND is applied to the set input of a flip-flop circuit 75 which is reset by an OR circuit 77 to receive the signal KOFF through a delay circuit 76 driven by the clock 4TCL and providing a delay time of one period of the clock 4TCL and the start signal STRT. The flip-flop circuit 75 generates a set output signal as shown by F3 in FIG. 5 when a correct key operation is performed on the keyboard 17.

The output signal F3 of the flip-flop circuit 75, the output signal F2 of the flip-flop circuit 68, and the output signal KOFF of the shift register 72 are applied to an AND circuit 78. The AND circuit 78 generates an output signal LR as shown in FIG. 5.

The AND circuit 74 generates an output signal AND when a key depression or key-on is performed on the keyboard 17 within an allowable length of time after the readout of note data from RAM 11. That is, the AND circuit 74 judges the key-on timing. F2×KOFF becomes logic level 1 when a key-release (key-off) is performed on the keyboard 17 within an allowable length of time. Thus, the AND circuit 78 generates an output signal LR when a key is depressed during a period of time substantially corresponding to the duration data read out of RAM 11. When the key is released too early, the AND circuit 78 does not generate an output signal since the flip-flop circuit 75 is reset by the output signal KOFF of the shift register 72.

The output signal LR of the AND circuit 78 is counted by a counter 79. The count output of the counter 79 is supplied to a dividing circuit 84 to be divided by the number of the notes read of RAM 11, that is, the count output COUNT (1) of the counter 23a so as to calculate the percentage of the number of key depressions each performed in correct duration. The correct duration percentage of key depressions is displayed by a display circuit 78.

The output signal of the latch circuit 63 and the output signal of the AND circuit 78 are supplied to an AND circuit 80. The AND circuit 80 generates an output signal only when the pupil timely depresses and releases a key corresponding to note data read out from RAM 11, that is, only when all of the three factors of the key-on timing, the duration of key depression, and the pitch are satisfied. The output signal of the AND circuit 80 is counted by a counter 81. The count output of the counter 81 is applied to a dividing circuit 88 and is divided by the count output COUNT (1) of the counter 23a for counting the number of notes read out of RAM 11 to calculate the percentage of the number of the correct notes played by the pupil, that is, the percentage of the number of key depressions each performed correctly with respect to all the above-mentioned three factors. The correct note percentage is displayed by a display circuit 89.

The count outputs A1, A2, and A3 of the counters 56, 61, and 79 are supplied to an addition circuit 90 to be added together. The count outputs COUNT (1) and COUNT (2) of the counters 23a and 23b are supplied to an arithmetic operation circuit 92 for performing a calculation of COUNT (1)×2+COUNT (2). The output of the addition circuit 90 is fed to a dividing circuit 91 and is divided by the output of the arithmetic operation circuit 92 to calculate the weighted mean or gross mean of the correct timing percentage, the correct pitch percentage, and the correct duration percentage. This mean value is displayed by a display circuit 93.

The rate of correct key operations is displayed in % which is capable of changing during performance in the above embodiment. For example, when subtraction circuits are used in place of the dividing circuits 82 to 84 and 88, the number of erroneous key operations may be displayed. Alternatively, the count outputs of the counters 56, 61, 79, and 81 may be directly displayed. The COUNT (1) and COUNT (2) may be preset to their final values, respectively so that the final results of pupil are displayed after the end of performance.

What we claim is:

1. An electronic musical instrument comprising:
   memory means for storing exemplary performance data representative of progression of notes of a musical piece and corresponding to key operations to be effected on a keyboard to play the musical piece, said performance data including pitch data and duration data of respective notes of the music;
   readout control means coupled to said memory means for reading said performance data sequentially out of said memory means in accordance with the progression of the musical piece;
   keyboard means responsive to key operations to produce musical performance signals corresponding to musical notes; and
   key operation judging circuit means coupled to said keyboard means for comparing said musical performance signals produced by said keyboard means with said performance data read out of said memory means to detect whether or not each of said key operations is correctly effected on said keyboard means in accordance with the respective performance data read out of said memory means;
   said readout control means including means for reading performance data corresponding to a note out of said memory means after the elapse of a period of time corresponding to the duration data of a preceding note from the readout of performance data of said preceding note; and
   said key operation judging circuit means including means for effecting a comparison between a time interval corresponding to the duration data of a given note and a time interval beginning from the time of a key depression operation corresponding to said given note to a succeeding key releases operation on said keyboard means.

2. The electronic musical instrument according to claim 1 wherein said readout control means includes means for producing first and second timing signals respectively corresponding to commencement and termination of the readout of one performance data from said memory means; said keyboard means includes means for producing third and fourth timing signals respectively corresponding to commencement and termination of one key operation on said keyboard means; and said key operation judging circuit means includes means responsive to said first and third timing signals to produce a key-on timing coincidence signal when said first and third timing signals are produced within an interval of a predetermined length of time left therebetween, a bistable circuit responsive to said key-on timing coincidence signal to change its state from a first state to a second state, and means responsive to said second and fourth timing signals and said second state of said bistable circuit to produce a duration coincidence signal when said second and fourth timing signals are produced within an interval of a predetermined length of time left therebetween.

3. An electronic musical instrument comprising:
  memory means for storing exemplary performance data representative of progression of notes of a musical piece and corresponding to key operations to be effected on a keyboard to play the musical piece;
  readout control means coupled to said memory means for reading said performance data sequentially out of said memory means in accordance with the progression of the musical piece;
  keyboard means responsive to key operations to produce musical performance signals corresponding to musical notes; and
  key operation judging circuit means coupled to said keyboard means for comparing said musical performance signals produced by said keyboard means with said performance data read out of said memory means to detect whether or not each of said key operations is correctly effected on said keyboard means in accordance with the respective performance data read out of said memory means;
  said readout control means including means for reading performance data indicative of the pitch of a note out of said memory means after the elapse of a period of time corresponding to the duration of a preceding note from the readout of performance data indicative of the pitch of said preceding note; and
  said key operation judging circuit means including:
    pitch comparison circuit means for effecting a comparison between performance data indicative of the pitch of a note read out of said memory means and a performance signal of said keyboard means indicative of the pitch of a note of an operated key; and
    duration comparison circuit means for effecting a comparison between a time interval corresponding to the duration data of a given note and a time interval beginning from the time of a key depression operation corresponding to said given note to a succeeding key release operation on said keyboard means.

4. An electronic musical instrument comprising:
  memory means for storing exemplary performance data representative of progression of notes of a musical piece and corresponding to key operations to be effected on a keyboard to play the musical piece;
  readout control means coupled to said memory means for reading said performance data sequentially out of said memory means in accordance with the progression of the musical piece;
  keyboard means responsive to key operations to produce musical performance signals corresponding to musical notes; and
  key operation judging circuit means coupled to said keyboard means for comparing said musical performance signals produced by said keyboard means with said performance data read out of said memory means to detect whether or not each of said key operations is correctly effected on said keyboard means in accordance with the respective performance data read out of said memory means;
  said key operation judging circuit means including:
    comparison means for effecting a comparison between a timing of readout of performance data corresponding to a note from said memory means and a timing of operation of a key corresponding to said note on said keyboard means; and
    tolerance setting means coupled to said comparison means for establishing a tolerance for said comparison effected by said comparison means, said key operation judging circuit means judging a key operation as correct when a difference between said readout timing and said key operation timing is within said tolerance established by said tolerance setting means.

5. The electronic musical instrument according to any one of claims 1, 3 or 4, wherein:
  said performance data includes data corresponding to timing of notes, pitch of notes and duration of notes of said musical piece;
  said key operation judging circuit means include counting means for counting the number of correct key operations effected on said keyboard means with respect to key-on timing, and pitch and duration of the respective performance data; and
  said electronic musical instrument further comprises;
  marking circuit means coupled to said key operation judging circuit means for calculating percentages of correct key operations with respect to the key-on timing, and the pitch and duration of the respective performance data; and
  display means coupled to said marking circuit means for visually indicating said percentages of correct key operations.

6. The electronic musical instrument according to claim 1 or 3, wherein said key operation judging circuit means includes:
  comparison means for effecting a comparison between a timing of readout of performance data corresponding to a note from said memory means and a timing of operation of a key corresponding to said note on said keyboard means; and
  tolerance setting means coupled to said comparison means for establishing a tolerance for said comparison effected by said comparison means, said key operation judging circuit means judging a key operation as correct when a difference between said readout timing and said key operation timing is within said tolerance established by said tolerance setting means.

7. The electronic musical instrument according to claim 4 wherein:
  said readout control means includes means responsive to readout of performance data corresponding to a note from said memory means to produce a first timing signal;
  said keyboard means includes means responsive to operation of a key corresponding to said note to produce a second timing signal; and said key operation judging circuit means includes means for expanding duration of said first and second timing signals to predetermined tolerance durations respectively, said key operation judging circuit means judging that a key operation is correct in timing when a difference between occurrence timings of said first and second timing signals is within a predetermined tolerance determined by said expanding means.

8. The electronic musical instrument according to claim 4 or 7 wherein said key operation judging circuit means further includes means for effecting a comparison between performance data indicative of the pitch of a note read out of said memory means and a performance signal of said keyboard means indicative of the pitch of a note corresponding to an operated key.

9. The electronic musical instrument according to claim 8 wherein said key operation judging circuit means further comprises a bistable circuit responsive to a coincidence between the performance data and the performance signal in the pitch to change its state.

10. The electronic musical instrument according to claim 4 wherein said key operation judging circuit means includes counting means for counting the number of correct key operations on said keyboard means.

11. The electronic musical instrument according to claim 4 wherein said key operation judging circuit means includes first counting means for counting the number of correct key operations on said keyboard means; and wherein said musical instrument further comprises second counting means for counting the number of performance data read out of said memory means, arithmetic operation circuit means responsive to count outputs of said first and second counting means to obtain a percentage of the number of said correct key operations relative to the number of said performance data read out of said memory means coupled to said arithmetic operation circuit means, and display means to visually indicate said percentage.

* * * * *

UNITED STATES PATENT AND TRADEMARK OFFICE
CERTIFICATE OF CORRECTION

PATENT NO. : 4,364,299
DATED : December 21, 1982
INVENTOR(S) : Akira NAKADA et al It is certified that error appears in the above-identified patent and that said Letters Patent is hereby corrected as shown below:

Column 12, line 18, after "memory means", insert --, and display means--;

line 19, delete "and display means".

Signed and Sealed this

Seventeenth Day of May 1983

[SEAL]

Attest:

DONALD J. QUIGG

Attesting Officer

Acting Commissioner of Patents and Trademarks